J. P. Chamberlin,
Bed Bottom.
No. 98,146. Patented Dec. 21, 1869.

Witnesses,

Inventor,
James P. Chamberlin

United States Patent Office.

JAMES P. CHAMBERLIN, OF ABINGTON, MASSACHUSETTS.

Letters Patent No. 98,146, dated December 21, 1869.

IMPROVED SPRING-BED BOTTOM.

The Schedule referred to in these Letters Patent and making part of the same.

*To all whom it may concern:*

Be it known that I, JAMES P. CHAMBERLIN, of Abington, in the county of Plymouth, and State of Massachusetts, have invented an Improvement in Spring-Bed Bottoms, of which the following is a full, clear, and exact description, reference being had to the accompanying drawings, making part of this specification, in which—

My invention has for its object to produce a spring-bed bottom, of simple construction, which can be afforded at a low cost, and consists in the employment of springs of peculiar form, each spring being composed of a rod, secured rigidly at one end, the opposite end being provided with an arm or lever, which is secured to the slat at or near its end, the depression of which produces a torsion of the rod, and as two of these springs are secured to each slat, the depression of one end will carry down the other, and the slat will thus be maintained at all times in a horizontal or nearly-horizontal position, instead of one end being thrown up by the depression of the other, as is the case in many of the spring-bed bottoms now in use.

To enable others skilled in the art to understand and use my invention, I will proceed to describe the manner in which I have carried it out.

In the said drawings—

A A represent the side pieces of the bed-bottom, and B B, the rails, to which are secured the springs $a$, which support the slats C C.

Figure 3:
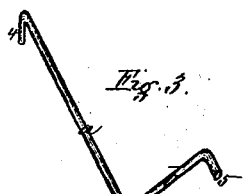
Figure 3 is a perspective view of one of the springs detached.

These springs, which are composed of rods of steel, or other suitable metal, are laid parallel to each other, and one end of each spring is secured rigidly to the rail by driving into it the bent portion 4, fig. 3.

The opposite end of the spring is bent so as to form an arm or lever, $b$, the end 5 of which is bent at a right angle, and passes through the slat, where it is riveted, so as to hold the slat in place.

If preferred, the end 5 may be secured to the underside of the slat, by a strap or staples, instead of passing through the slat.

The horizontal portion of each spring, near the arm $b$, is steadied, and prevented from being thrown out of place, by a staple, $c$, driven into the rail.

On pressure being applied to a slat, C, the arm $b$ is turned, or partially revolved, which twists the horizontal portion of the spring $a$, the torsion thus produced causing the arm to return the slat to its original position, on the pressure being removed therefrom.

A simple, effective, and noiseless spring is thus produced, which is not liable to set or break.

Figure 1:
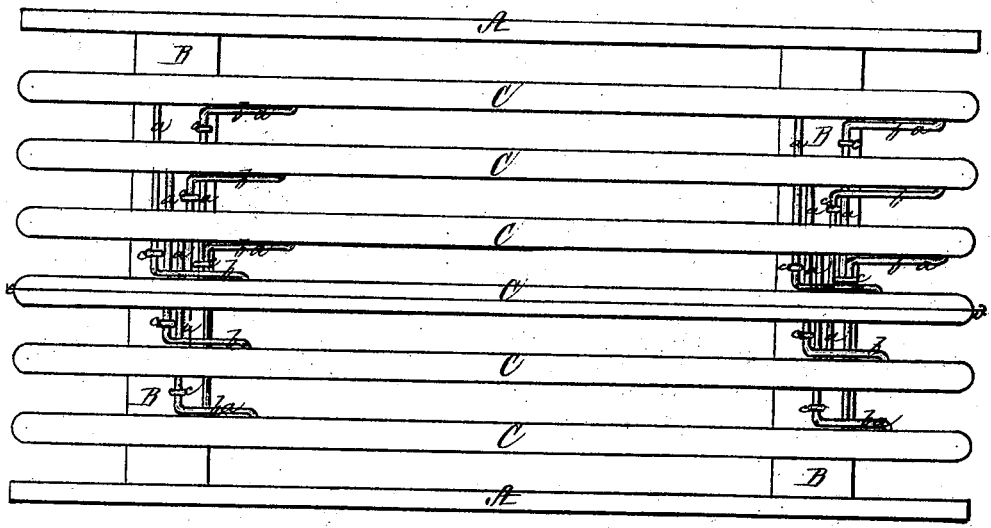
Figure 1 is a plan of my improved spring-bed bottom.
Figure 2:
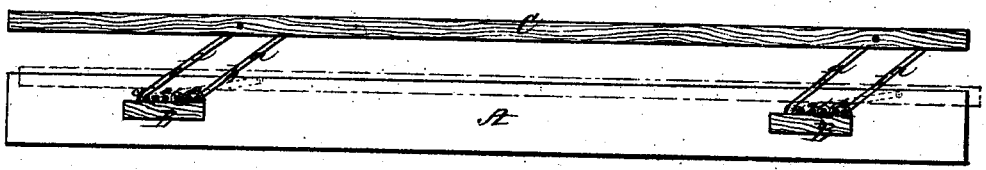
Figure 2 is a section, on the line $x\ x$ of fig. 1.

It will be seen, that as each slat is secured to and supported upon two springs, the depression of one end of the slat will carry it forward, and turn the arm of the spring at the opposite end, and, consequently, both ends of the slat will be depressed simultaneously, as seen in dotted lines, fig. 2.

The body of the person lying upon the bed will thus be maintained, at all times, in a horizontal or nearly horizontal position, and the discomfort, arising from one end of the slat being thrown up, by pressure upon the opposite end, is thus entirely avoided.

A bed-bottom, constructed as above described, may be afforded at a low cost, on account of its simplicity of construction, while it is not liable to break, or get out of order.

Claim.

What I claim as my invention, and desire to secure by Letters Patent, is—

The springs $a$, with their arms $b$, in combination with the slats C, when constructed to operate substantially as and for the purpose described.

JAMES P. CHAMBERLIN.

Witnesses:
P. E. TESCHEMACHER,
N. W. STEARNS.